(12) United States Patent
Weir

(10) Patent No.: US 7,561,317 B2
(45) Date of Patent: Jul. 14, 2009

(54) RESONANT FOURIER SCANNING

(75) Inventor: Michael P. Weir, Blanchester, OH (US)

(73) Assignee: Ethicon Endo-Surgery, Inc., Cincinnati, OH (US)

( * ) Notice: Subject to any disclaimer, the term of this patent is extended or adjusted under 35 U.S.C. 154(b) by 443 days.

(21) Appl. No.: 11/592,755

(22) Filed: Nov. 3, 2006

(65) Prior Publication Data

US 2008/0106777 A1    May 8, 2008

(51) Int. Cl.
    *G02B 26/08*    (2006.01)
(52) U.S. Cl. .............. 359/201.1; 359/201.2; 359/224.1
(58) Field of Classification Search .............. 359/201.1, 359/201.2
    See application file for complete search history.

(56) References Cited

U.S. PATENT DOCUMENTS

| | | | |
|---|---|---|---|
| 3,758,199 A | * | 9/1973 | Thaxter .................... 359/224.1 |
| 3,959,582 A | | 5/1976 | Law et al. |
| 4,082,635 A | | 4/1978 | Fritz et al. |
| 4,141,362 A | | 2/1979 | Wurster |
| 4,313,431 A | | 2/1982 | Frank |
| 4,379,039 A | | 4/1983 | Fujimoto et al. |
| 4,403,273 A | | 9/1983 | Nishioka |
| 4,409,477 A | | 10/1983 | Carl |
| 4,421,382 A | | 12/1983 | Doi et al. |
| 4,524,761 A | | 6/1985 | Hattori et al. |
| 4,527,552 A | | 7/1985 | Hattori |
| 4,573,465 A | | 3/1986 | Sugiyama et al. |
| 4,576,999 A | | 3/1986 | Eckberg |
| 4,597,380 A | | 7/1986 | Raif et al. |
| 4,643,967 A | | 2/1987 | Bryant |
| 4,676,231 A | | 6/1987 | Hisazumi et al. |
| 4,760,840 A | | 8/1988 | Fournier, Jr. et al. |
| 4,803,550 A | | 2/1989 | Yabe et al. |
| 4,872,458 A | | 10/1989 | Kanehira et al. |
| 4,902,083 A | | 2/1990 | Wells |
| 4,902,115 A | | 2/1990 | Takahashi |
| 4,934,773 A | | 6/1990 | Becker |

(Continued)

FOREIGN PATENT DOCUMENTS

DE         3837248        5/1990

(Continued)

OTHER PUBLICATIONS

PCT, International Search Report, PCT/US2008/066552 (Oct. 23, 2008).

(Continued)

*Primary Examiner*—James Phan
(74) *Attorney, Agent, or Firm*—Victor Moreno

(57) ABSTRACT

A scanning beam assembly comprising: a beam generator to generate a beam of radiation, and two or more oscillating reflectors configured to deflect the beam in sequence, each reflector being driven to contribute an incremental deflection of the beam so as to achieve a desired scanning beam waveform, at least one oscillating reflector aligned to receive the beam from the beam generator and deflect the beam to a second oscillating reflector, each oscillating reflector operating in a sinusoidal mode having a frequency and amplitude, and a controller for controlling the phase and/or frequency and/or amplitude of the oscillation of the reflectors so as to provide a desired scanning beam waveform.

20 Claims, 8 Drawing Sheets

U.S. PATENT DOCUMENTS

| | | |
|---|---|---|
| 4,938,205 A | 7/1990 | Nudelman |
| 5,003,300 A | 3/1991 | Wells |
| 5,023,905 A | 6/1991 | Wells et al. |
| 5,048,077 A | 9/1991 | Wells et al. |
| 5,074,860 A | 12/1991 | Gregory et al. |
| 5,078,150 A | 1/1992 | Hara et al. |
| 5,163,936 A | 11/1992 | Black et al. |
| 5,163,945 A | 11/1992 | Ortiz et al. |
| 5,172,685 A | 12/1992 | Nudelman |
| 5,192,288 A | 3/1993 | Thompson et al. |
| 5,200,819 A | 4/1993 | Nudelman et al. |
| 5,200,838 A | 4/1993 | Nudelman et al. |
| 5,251,025 A | 10/1993 | Cooper et al. |
| 5,251,613 A | 10/1993 | Adair |
| 5,269,289 A | 12/1993 | Takehana et al. |
| 5,318,024 A | 6/1994 | Kittrell et al. |
| 5,334,991 A | 8/1994 | Wells et al. |
| 5,368,015 A | 11/1994 | Wilk |
| 5,370,643 A | 12/1994 | Krivoshlykov et al. |
| 5,387,197 A | 2/1995 | Smith et al. |
| 5,393,647 A | 2/1995 | Neukermans et al. |
| 5,467,104 A | 11/1995 | Furness, III et al. |
| 5,488,862 A | 2/1996 | Neukermans et al. |
| 5,531,740 A | 7/1996 | Black |
| 5,545,211 A | 8/1996 | An et al. |
| 5,552,452 A | 9/1996 | Khadem et al. |
| 5,557,444 A | 9/1996 | Melville et al. |
| 5,590,660 A | 1/1997 | MacAulay et al. |
| 5,596,339 A | 1/1997 | Furness, III et al. |
| 5,608,451 A | 3/1997 | Konno et al. |
| 5,629,790 A | 5/1997 | Neukermans et al. |
| 5,648,618 A | 7/1997 | Neukermans et al. |
| 5,649,952 A | 7/1997 | Lam |
| 5,657,165 A | 8/1997 | Karpman et al. |
| 5,658,710 A | 8/1997 | Neukermans |
| 5,659,327 A | 8/1997 | Furness, III et al. |
| 5,694,237 A | 12/1997 | Melville |
| 5,701,132 A | 12/1997 | Kollin et al. |
| 5,713,891 A | 2/1998 | Poppas |
| 5,728,121 A | 3/1998 | Bimbo et al. |
| 5,735,792 A | 4/1998 | Vanden Hoek et al. |
| 5,742,419 A | 4/1998 | Dickensheets et al. |
| 5,742,421 A | 4/1998 | Wells et al. |
| 5,751,465 A | 5/1998 | Melville et al. |
| 5,797,944 A | 8/1998 | Nobles et al. |
| 5,817,061 A | 10/1998 | Goodwin et al. |
| 5,823,943 A | 10/1998 | Tomioka et al. |
| 5,827,176 A | 10/1998 | Tanaka et al. |
| 5,827,190 A | 10/1998 | Palcic et al. |
| 5,841,553 A | 11/1998 | Neukermans |
| 5,861,549 A | 1/1999 | Neukermans et al. |
| 5,867,297 A | 2/1999 | Kiang et al. |
| 5,895,866 A | 4/1999 | Neukermans et al. |
| 5,903,397 A | 5/1999 | Melville et al. |
| 5,907,425 A | 5/1999 | Dickensheets et al. |
| 5,913,591 A | 6/1999 | Melville |
| 5,947,930 A | 9/1999 | Schwemberger et al. |
| 5,969,465 A | 10/1999 | Neukermans et al. |
| 5,969,871 A | 10/1999 | Tidwell et al. |
| 5,982,528 A | 11/1999 | Melville |
| 5,982,555 A | 11/1999 | Melville et al. |
| 5,993,037 A | 11/1999 | Tomioka et al. |
| 5,995,264 A | 11/1999 | Melville |
| 6,007,208 A | 12/1999 | Dickensheets et al. |
| 6,008,781 A | 12/1999 | Furness, III et al. |
| 6,013,025 A | 1/2000 | Bonne et al. |
| 6,016,440 A | 1/2000 | Simon et al. |
| 6,017,356 A | 1/2000 | Frederick et al. |
| 6,017,603 A | 1/2000 | Tokuda et al. |
| 6,024,744 A | 2/2000 | Kese et al. |
| 6,043,799 A | 3/2000 | Tidwell |
| 6,044,705 A | 4/2000 | Neukermans et al. |
| 6,046,720 A | 4/2000 | Melville et al. |
| 6,049,407 A | 4/2000 | Melville |
| 6,056,721 A | 5/2000 | Shulze et al. |
| 6,057,952 A | 5/2000 | Kubo et al. |
| 6,059,720 A | 5/2000 | Furusawa et al. |
| 6,061,163 A | 5/2000 | Melville |
| 6,064,779 A | 5/2000 | Neukermans et al. |
| 6,069,725 A | 5/2000 | Melville |
| 6,086,528 A | 7/2000 | Adair |
| 6,086,531 A | 7/2000 | Tomioka et al. |
| 6,088,145 A | 7/2000 | Dickensheets et al. |
| 6,097,353 A | 8/2000 | Melville et al. |
| 6,122,394 A | 9/2000 | Neukermans et al. |
| 6,139,175 A | 10/2000 | Tomioka et al. |
| 6,140,979 A | 10/2000 | Gerhard et al. |
| 6,151,167 A | 11/2000 | Melville |
| 6,154,305 A | 11/2000 | Dickensheets et al. |
| 6,154,321 A | 11/2000 | Melville et al. |
| 6,157,352 A | 12/2000 | Kollin et al. |
| 6,166,841 A | 12/2000 | Melville |
| 6,172,789 B1 | 1/2001 | Kino et al. |
| 6,178,346 B1 | 1/2001 | Amundson et al. |
| 6,179,776 B1 | 1/2001 | Adams et al. |
| 6,191,761 B1 | 2/2001 | Melville et al. |
| 6,192,267 B1 | 2/2001 | Scherninski et al. |
| 6,200,595 B1 | 3/2001 | Motoyashiki et al. |
| 6,204,829 B1 | 3/2001 | Tidwell |
| 6,204,832 B1 | 3/2001 | Melville et al. |
| 6,207,392 B1 | 3/2001 | Weiss et al. |
| 6,220,711 B1 | 4/2001 | Melville |
| 6,221,068 B1 | 4/2001 | Fried et al. |
| 6,229,139 B1 | 5/2001 | Neukermans et al. |
| 6,235,017 B1 | 5/2001 | Jegorov et al. |
| 6,243,186 B1 | 6/2001 | Melville |
| 6,245,590 B1 | 6/2001 | Wine et al. |
| 6,256,131 B1 | 7/2001 | Wine et al. |
| 6,257,727 B1 | 7/2001 | Melville |
| 6,272,907 B1 | 8/2001 | Neukermans et al. |
| 6,276,798 B1 | 8/2001 | Gil et al. |
| 6,281,862 B1 | 8/2001 | Tidwell et al. |
| 6,284,185 B1 | 9/2001 | Tokuda et al. |
| 6,285,489 B1 | 9/2001 | Helsel et al. |
| 6,285,505 B1 | 9/2001 | Melville et al. |
| 6,288,816 B1 | 9/2001 | Melville et al. |
| 6,292,287 B1 | 9/2001 | Fujinoki |
| 6,293,911 B1 | 9/2001 | Imaizumi et al. |
| 6,294,239 B1 | 9/2001 | Tokuda et al. |
| 6,294,775 B1 | 9/2001 | Seibel et al. |
| 6,317,103 B1 | 11/2001 | Furness, III et al. |
| 6,323,037 B1 | 11/2001 | Lauto et al. |
| 6,324,007 B1 | 11/2001 | Melville |
| 6,327,493 B1 | 12/2001 | Ozawa et al. |
| 6,331,909 B1 | 12/2001 | Dunfield |
| 6,333,110 B1 | 12/2001 | Barbera-Guillem |
| 6,338,641 B2 | 1/2002 | Nicholls |
| 6,352,344 B2 | 3/2002 | Tidwell |
| 6,353,183 B1 | 3/2002 | Ott et al. |
| 6,362,912 B1 | 3/2002 | Lewis et al. |
| 6,364,829 B1 | 4/2002 | Fulghum |
| 6,369,928 B1 | 4/2002 | Mandella et al. |
| 6,369,953 B2 | 4/2002 | Melville et al. |
| 6,369,954 B1 | 4/2002 | Berge et al. |
| 6,370,406 B1 | 4/2002 | Wach et al. |
| 6,370,422 B1 | 4/2002 | Richards-Kortum et al. |
| 6,373,995 B1 | 4/2002 | Moore |
| 6,384,406 B1 | 5/2002 | Wine et al. |
| 6,388,641 B2 | 5/2002 | Tidwell et al. |
| 6,392,220 B1 | 5/2002 | Slater et al. |
| 6,396,461 B1 | 5/2002 | Lewis et al. |
| 6,414,779 B1 | 7/2002 | Mandella et al. |
| 6,417,502 B1 | 7/2002 | Stoner et al. |
| 6,423,956 B1 | 7/2002 | Mandella et al. |

| Patent | Date | Inventor |
|---|---|---|
| 6,425,900 B1 | 7/2002 | Knodel et al. |
| 6,426,013 B1 | 7/2002 | Neukermans et al. |
| 6,433,907 B1 | 8/2002 | Lippert et al. |
| 6,435,637 B1 | 8/2002 | Lyman |
| 6,441,356 B1 | 8/2002 | Mandella et al. |
| 6,445,362 B1 | 9/2002 | Tegreene |
| 6,447,524 B1 | 9/2002 | Knodel et al. |
| 6,462,770 B1 | 10/2002 | Cline et al. |
| 6,464,363 B1 | 10/2002 | Nishioka et al. |
| 6,467,345 B1 | 10/2002 | Neukermans et al. |
| 6,470,124 B1 | 10/2002 | Le Gargasson et al. |
| 6,477,403 B1 | 11/2002 | Eguchi et al. |
| 6,478,809 B1 | 11/2002 | Brotz |
| 6,485,413 B1 | 11/2002 | Boppart et al. |
| 6,492,962 B2 | 12/2002 | Melville et al. |
| 6,494,578 B1 | 12/2002 | Plummer et al. |
| 6,503,196 B1 | 1/2003 | Kehr et al. |
| 6,510,338 B1 | 1/2003 | Irion et al. |
| 6,512,622 B2 | 1/2003 | Wine et al. |
| 6,513,939 B1 | 2/2003 | Fettig et al. |
| 6,515,278 B2 | 2/2003 | Wine et al. |
| 6,515,781 B2 | 2/2003 | Lewis et al. |
| 6,520,972 B2 | 2/2003 | Peters |
| 6,522,444 B2 | 2/2003 | Mandella et al. |
| 6,525,310 B2 | 2/2003 | Dunfield |
| 6,527,708 B1 | 3/2003 | Nakamura et al. |
| 6,529,770 B1 | 3/2003 | Grimblatov |
| 6,530,698 B1 | 3/2003 | Kuhara et al. |
| 6,535,183 B2 | 3/2003 | Melville et al. |
| 6,535,325 B2 | 3/2003 | Helsel et al. |
| 6,537,211 B1 | 3/2003 | Wang et al. |
| 6,538,625 B2 | 3/2003 | Tidwell et al. |
| 6,545,260 B1 | 4/2003 | Katashiro et al. |
| 6,560,028 B2 | 5/2003 | Melville et al. |
| 6,563,105 B2 | 5/2003 | Seibel et al. |
| 6,563,106 B1 | 5/2003 | Bowers et al. |
| 6,583,117 B2 | 6/2003 | Owen et al. |
| 6,583,772 B1 | 6/2003 | Lewis et al. |
| 6,585,642 B2 | 7/2003 | Christopher |
| 6,603,552 B1 | 8/2003 | Cline et al. |
| 6,608,297 B2 | 8/2003 | Neukermans et al. |
| 6,639,570 B2 | 10/2003 | Furness, III et al. |
| 6,639,719 B2 | 10/2003 | Tegreene et al. |
| 6,650,877 B1 | 11/2003 | Tarbouriech et al. |
| 6,653,621 B2 | 11/2003 | Wine et al. |
| 6,654,158 B2 | 11/2003 | Helsel et al. |
| 6,661,393 B2 | 12/2003 | Tegreene et al. |
| 6,674,993 B1 | 1/2004 | Tarbouriech |
| 6,685,804 B1 | 2/2004 | Ikeda et al. |
| 6,687,034 B2 | 2/2004 | Wine et al. |
| 6,689,056 B1 | 2/2004 | Kilcoyne et al. |
| 6,699,170 B1 | 3/2004 | Crocker et al. |
| 6,700,552 B2 | 3/2004 | Kollin et al. |
| 6,714,331 B2 | 3/2004 | Lewis et al. |
| 6,734,835 B2 | 5/2004 | Tidwell et al. |
| 6,736,511 B2 | 5/2004 | Plummer et al. |
| 6,741,884 B1 | 5/2004 | Freeman et al. |
| 6,749,346 B1 | 6/2004 | Dickensheets et al. |
| 6,755,536 B2 | 6/2004 | Tegreene et al. |
| 6,762,867 B2 | 7/2004 | Lippert et al. |
| 6,768,588 B2 | 7/2004 | Urey |
| 6,771,001 B2 | 8/2004 | Mao et al. |
| 6,782,748 B2 | 8/2004 | Weber et al. |
| 6,786,382 B1 | 9/2004 | Hoffman |
| 6,795,221 B1 | 9/2004 | Urey |
| 6,802,809 B2 | 10/2004 | Okada |
| 6,803,561 B2 | 10/2004 | Dunfield |
| 6,821,245 B2 | 11/2004 | Cline et al. |
| 6,845,190 B1 | 1/2005 | Smithwick et al. |
| 6,856,436 B2 | 2/2005 | Brukilacchio et al. |
| 6,856,712 B2 | 2/2005 | Fauver et al. |
| 6,879,428 B2 | 4/2005 | Massieu |
| 6,888,552 B2 | 5/2005 | Debevec et al. |
| 6,894,823 B2 | 5/2005 | Taylor et al. |
| 6,899,675 B2 | 5/2005 | Cline et al. |
| 6,902,527 B1 | 6/2005 | Doguchi et al. |
| 6,905,057 B2 | 6/2005 | Swayze et al. |
| 6,939,364 B1 | 9/2005 | Soltz et al. |
| 6,957,898 B2 | 10/2005 | Yu |
| 6,967,757 B1 | 11/2005 | Allen et al. |
| 6,974,472 B2 | 12/2005 | Hong et al. |
| 6,975,898 B2 | 12/2005 | Seibel et al. |
| 6,976,994 B2 | 12/2005 | Ballou et al. |
| 6,978,921 B2 | 12/2005 | Shelton, IV et al. |
| 6,985,271 B2 | 1/2006 | Yazdi et al. |
| 6,991,602 B2 | 1/2006 | Nakazawa et al. |
| 7,005,195 B2 | 2/2006 | Cheng et al. |
| 7,009,634 B2 | 3/2006 | Iddan et al. |
| 7,013,730 B2 | 3/2006 | Malametz |
| 7,015,956 B2 | 3/2006 | Luo et al. |
| 7,018,401 B1 | 3/2006 | Hyodoh et al. |
| 7,023,402 B2 | 4/2006 | Lewis et al. |
| 7,025,777 B2 | 4/2006 | Moore |
| 7,033,348 B2 | 4/2006 | Alfano et al. |
| 7,035,777 B2 | 4/2006 | Araki et al. |
| 7,061,450 B2 | 6/2006 | Bright et al. |
| 7,065,301 B2 | 6/2006 | Shastri et al. |
| 7,066,879 B2 | 6/2006 | Fowler et al. |
| 7,071,594 B1 | 7/2006 | Yan et al. |
| 7,071,931 B2 | 7/2006 | Tegreene et al. |
| 7,078,378 B1 | 7/2006 | Owen et al. |
| 7,108,656 B2 | 9/2006 | Fujikawa et al. |
| 7,112,302 B2 | 9/2006 | Yoshimi et al. |
| 7,126,903 B2 | 10/2006 | Feenstra et al. |
| 7,189,961 B2 | 3/2007 | Johnston et al. |
| 7,190,329 B2 | 3/2007 | Lewis et al. |
| 7,232,071 B2 | 6/2007 | Lewis et al. |
| 7,271,383 B2 | 9/2007 | Chee |
| 7,391,013 B2 | 6/2008 | Johnston et al. |
| 2001/0055462 A1 | 12/2001 | Seibel |
| 2002/0015724 A1 | 2/2002 | Yang et al. |
| 2002/0024495 A1 | 2/2002 | Lippert et al. |
| 2002/0050956 A1 | 5/2002 | Gerhard et al. |
| 2002/0075284 A1 | 6/2002 | Rabb, III |
| 2002/0088925 A1 | 7/2002 | Nestorovic et al. |
| 2002/0115922 A1 | 8/2002 | Waner et al. |
| 2002/0141026 A1 | 10/2002 | Wiklof et al. |
| 2002/0158814 A1 | 10/2002 | Bright et al. |
| 2002/0163484 A1 | 11/2002 | Furness, III et al. |
| 2002/0167462 A1 | 11/2002 | Lewis et al. |
| 2002/0171776 A1 | 11/2002 | Tegreene et al. |
| 2002/0171937 A1 | 11/2002 | Tegreene et al. |
| 2003/0016187 A1 | 1/2003 | Melville et al. |
| 2003/0030753 A1 | 2/2003 | Kondo et al. |
| 2003/0032143 A1 | 2/2003 | Neff et al. |
| 2003/0034709 A1 | 2/2003 | Jerman |
| 2003/0058190 A1 | 3/2003 | Lewis et al. |
| 2003/0086172 A1 | 5/2003 | Urey |
| 2003/0092995 A1 | 5/2003 | Thompson |
| 2003/0130562 A1 | 7/2003 | Barbato et al. |
| 2003/0142934 A1 | 7/2003 | Pan et al. |
| 2003/0159447 A1 | 8/2003 | Sergio et al. |
| 2003/0214460 A1 | 11/2003 | Kovacs |
| 2003/0216729 A1 | 11/2003 | Marchitto et al. |
| 2004/0004585 A1 | 1/2004 | Brown et al. |
| 2004/0057103 A1 | 3/2004 | Bernstein |
| 2004/0075624 A1 | 4/2004 | Tegreene et al. |
| 2004/0076390 A1 | 4/2004 | Dong Yang et al. |
| 2004/0085261 A1 | 5/2004 | Lewis et al. |
| 2004/0085617 A1 | 5/2004 | Helsel et al. |
| 2004/0087844 A1 | 5/2004 | Yen |
| 2004/0101822 A1 | 5/2004 | Wiesner et al. |
| 2004/0118821 A1 | 6/2004 | Han et al. |
| 2004/0119004 A1 | 6/2004 | Wine et al. |
| 2004/0122328 A1 | 6/2004 | Wang et al. |
| 2004/0133786 A1 | 7/2004 | Tarbouriech |

| | | | |
|---|---|---|---|
| 2004/0151466 A1 | 8/2004 | Crossman-Bosworth et al. |
| 2004/0155186 A1 | 8/2004 | Nestorovic et al. |
| 2004/0155834 A1 | 8/2004 | Wit et al. |
| 2004/0179254 A1 | 9/2004 | Lewis et al. |
| 2004/0196518 A1 | 10/2004 | Wine et al. |
| 2004/0223202 A1 | 11/2004 | Lippert et al. |
| 2004/0225222 A1 | 11/2004 | Zeng et al. |
| 2004/0236371 A1 | 11/2004 | McNally-Heintzelman et al. |
| 2004/0240866 A1 | 12/2004 | Ramsbottom |
| 2004/0252377 A1 | 12/2004 | Urey |
| 2004/0254474 A1 | 12/2004 | Seibel et al. |
| 2005/0010787 A1 | 1/2005 | Tarbouriech |
| 2005/0014995 A1 | 1/2005 | Amundson et al. |
| 2005/0020877 A1 | 1/2005 | Ishihara et al. |
| 2005/0020926 A1 | 1/2005 | Wiklof et al. |
| 2005/0023356 A1 | 2/2005 | Wiklof et al. |
| 2005/0030305 A1 | 2/2005 | Brown et al. |
| 2005/0038322 A1 | 2/2005 | Banik |
| 2005/0116038 A1 | 6/2005 | Lewis et al. |
| 2005/0162762 A1 | 7/2005 | Novak |
| 2005/0187441 A1 | 8/2005 | Kawasaki et al. |
| 2005/0203343 A1 | 9/2005 | Kang et al. |
| 2005/0240147 A1 | 10/2005 | Makower et al. |
| 2006/0010985 A1 | 1/2006 | Schneider |
| 2006/0084867 A1 | 4/2006 | Tremblay et al. |
| 2006/0164330 A1 | 7/2006 | Bright et al. |
| 2006/0183246 A1 | 8/2006 | Wiesner et al. |
| 2006/0195014 A1 | 8/2006 | Seibel et al. |
| 2006/0238774 A1 | 10/2006 | Lindner et al. |
| 2006/0245971 A1 | 11/2006 | Burns et al. |
| 2006/0284790 A1 | 12/2006 | Tegreene et al. |
| 2007/0038119 A1 | 2/2007 | Chen et al. |
| 2007/0046778 A1 | 3/2007 | Ishihara et al. |
| 2007/0135770 A1 | 6/2007 | Hunt et al. |
| 2007/0156021 A1 | 7/2007 | Morse et al. |
| 2007/0161876 A1 | 7/2007 | Bambot et al. |
| 2007/0162093 A1 | 7/2007 | Porter et al. |
| 2007/0167681 A1 | 7/2007 | Gill et al. |
| 2007/0173707 A1 | 7/2007 | Mitra |
| 2007/0179366 A1 | 8/2007 | Pewzner et al. |
| 2007/0197875 A1 | 8/2007 | Osaka |
| 2007/0203413 A1 | 8/2007 | Frangioni |
| 2007/0213588 A1 | 9/2007 | Morishita et al. |
| 2007/0213618 A1 | 9/2007 | Li et al. |
| 2007/0225695 A1 | 9/2007 | Mayer et al. |
| 2007/0238930 A1 | 10/2007 | Wiklof et al. |
| 2007/0244365 A1 | 10/2007 | Wiklof |
| 2007/0260121 A1 | 11/2007 | Bakos et al. |
| 2007/0260273 A1 | 11/2007 | Cropper et al. |
| 2008/0058629 A1 | 3/2008 | Seibel et al. |

FOREIGN PATENT DOCUMENTS

| | | |
|---|---|---|
| EP | 1139141 | 10/2001 |
| EP | 1716802 | 11/2006 |
| JP | 2007-244590 | 9/2007 |
| JP | 2007-244680 | 9/2007 |
| WO | WO 98/13720 | 4/1998 |
| WO | WO 99/18456 | 4/1999 |
| WO | 00/13210 | 3/2000 |
| WO | 01/60274 | 8/2001 |
| WO | 02/062239 | 8/2002 |
| WO | WO 03/069380 | 8/2003 |
| WO | 03/088643 | 10/2003 |
| WO | 03/098918 | 11/2003 |
| WO | 03/101287 | 11/2003 |
| WO | 2006/020605 | 2/2006 |
| WO | WO 2006/049787 | 5/2006 |
| WO | WO 2006/055733 | 5/2006 |
| WO | 2007/041542 | 4/2007 |
| WO | 2007/070831 | 6/2007 |
| WO | WO 2007/067163 | 6/2007 |

OTHER PUBLICATIONS

Kiang, M-H et al., "Surface-Micromachined Electrostatic-Comb Driven Scanning Micromirrors for Barcode Scanners" (date of first publication unknown).
Lewis, J.R. et al., "Scanned beam medical imager," MOEMS Display and Imaging Systems II, Proceedings of SPIE vol. 5348, pp. 40-51 (2004).
James, R. et al., "Update on MEMS-based Scanned Beam Imager" (date of first publication unknown).
Wiklof, C., "Display technology spawns laser camera," Laser Focus World (Dec. 2004).
"Press Information—Phillips' Fluid Lenses Bring Things into Focus," http://www.newscenter.philips.com (Mar. 3, 2004).
Lettice, J., "The $5 'no moving parts' fluid zoom lens—twice," The Register (Mar. 15, 2004).
"Volcano Products—IVUS Imaging Visions® PV018," http://www.volcanotherapeutics.com (date of first publication unknown).
Barhoum, E.S. et al., "Optical modeling of an ultrathin scanning fiber endoscope, a preliminary study of confocal versus non-confocal detection," Optics Express, vol. 13, No. 19, pp. 7548-7652 (Sep. 19, 2005).
"Crystalplex Technology—PIxBead™ Superior Qualities," http:www.crystalplex.com (date of first publication unknown).
"Microvision [illuminating information] Products/Overview, Corporate Overview Presentation 2006" (2006).
"Holographic Beam Combiner for Ladar, Printer, Fiber Optics, and Cancer Treatment," by Digital Optics Technologies, Inc., http://www.mdatechnology.net (date of first publication unknown).
Brown, D.M., Abstract from SPIE Digital Library for "High-power laser diode beam combiner," Optical Engineering, vol. 42, Issue 11 (2003).
Literature entitled "All fiber beam combiner from Point Source" (Oct. 13, 2006).
"Custom Polarizing Cube Beamsplitters," from GlobalSpec The Engineering Search Engine, http://www.globalspec.com (date of first publication unknown).
Literature entitled "Dallas Semiconductor MAXIM—Visible-Laser Driver has Digitally Controlled Power Modulation," by Maxim Integrated Products, http://www.maxim-ic.com (Jul. 1, 2001).
"SCAN Mode Strategies for SCUBA-2" (May 25, 2005).
Seifert, M. et al., "High Power Diode Laser Beam Scanning in Multi-Kilowatt Range," Proceedings of the 23rd International Congress on Applications of Lasers and Electro-Optics (2004).
Jutzi, B. et al., "Sub-Pixel Edge Localization Based on Laser Waveform Analysis," ISPRS WG III/3, III/4, V/3 Workshop "Laser scanning 2005," Enschede, the Netherlands (Sep. 12-14, 2005).
"Bladeless Trocars," by Johnson & Johnson, http://www.jnjgateway.com (date of first publication unknown).
Yeh, R. et al., "Microelectromechanical Components for Articulated Microrobots" (date of first publication unknown).
Xu, Q. et al., "Micrometre-scale silicon electro-optic modulator," Nature, vol. 435, pp. 325-327 (May 19, 2005).
Park, H. et al., "Development of Double-Sided Silicon Strip Position Sensor," 2005 IEEE Nuclear Science Symposium Conference Record, pp. 781-785 (2005).
Hammond, S.W., "Architecture and Operation of a Systolic Sparse Matrix Engine," Proceedings of the 3rd SIAM Conference on Parallel Processing for Scientific Computing, pp. 419-423 (1987).
Ra, H. et al., "Biomedical Optics & Medical Imaging—Microtechnology enables endoscopic confocal microscopy," SPIE (http://spie.org) (2007).
PCT, International Search Report, PCT/US2008/056589 (Jul. 30, 2008).
PCT, International Search Report, PCT/US2008/059231 (Jul. 4, 2008).
PCT, International Search Report, PCT/US2007/087923 (May 21, 2008).
PCT, International Search Report, PCT/US2008/056596 (Jun. 23, 2008).

PCT, International Search Report, PCT/US2008/059235 (Jul. 14, 2008).
PCT, International Search Report, PCT/US2007/087930 (Jul. 3, 2008).
PCT, International Search Report, PCT/US2008/051274 (Jul. 18, 2008).

* cited by examiner

Fig. 4A
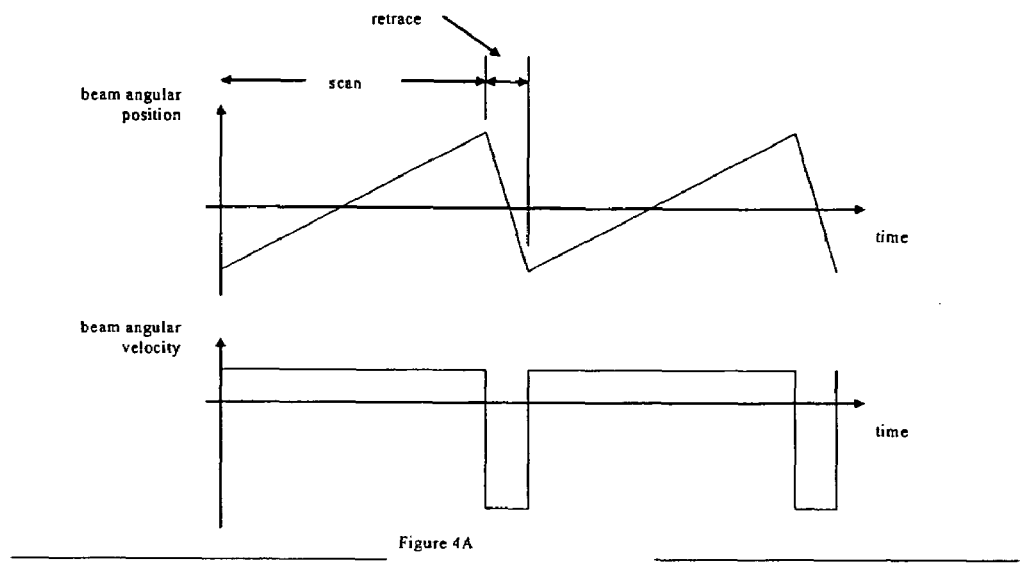
Figure 4A
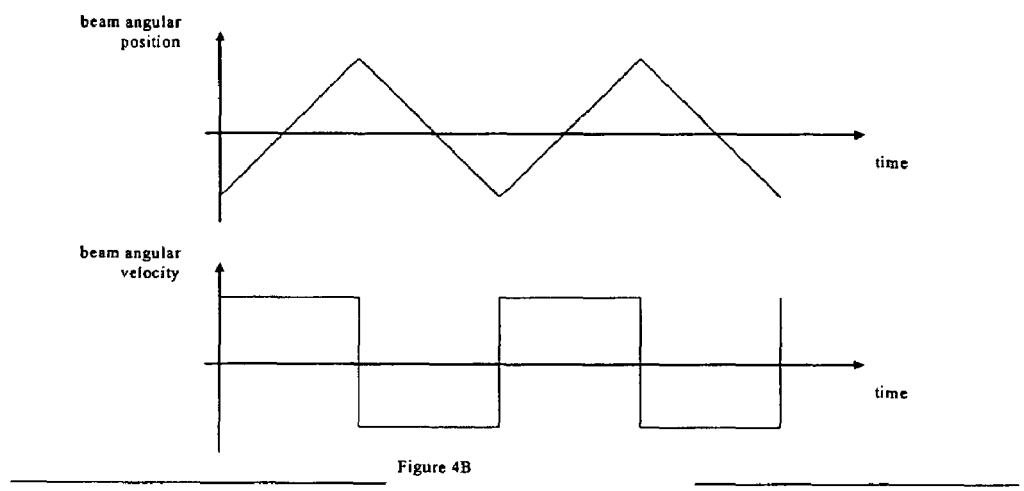
Figure 4B
Fig. 4B

RESONANT FOURIER SCANNING

FIELD OF INVENTION

This invention relates to improvements in scanning beam assemblies of the type that employ an oscillating reflector to control the scanning beam, as well as to scanning beam imaging systems incorporating such scanning assemblies and to corresponding improvements in devices, particularly medical devices, including resonant fourier scanning device.

BACKGROUND OF THE INVENTION

U.S. Published Application 2005/0020926A1 discloses a scanning beam imager which is reproduced in FIG. 1 herein. This imager can be used in applications in which cameras have been used in the past. In particular it can be used in medical devices such as video endoscopes, laparoscopes, etc.

FIG. 1 shows a block diagram of one example of a scanned beam imager 102. An illuminator 104 creates a first beam of light 106. A scanner 108 deflects the first beam of light across a field-of-view (FOV) to produce a second scanned beam of light 110, shown in two positions 110a and 110b. The scanned beam of light 110 sequentially illuminates spots 112 in the FOV, shown as positions 112a and 112b, corresponding to beam positions 110a and 110b, respectively. While the beam 110 illuminates the spots 112, the illuminating light beam 110 is reflected, absorbed, scattered, refracted, or otherwise affected by the object or material in the FOV to produce scattered light energy. A portion of the scattered light energy 114, shown emanating from spot positions 112a and 112b as scattered energy rays 114a and 114b, respectively, travels to one or more detectors 116 that receive the light and produce electrical signals corresponding to the amount of light energy received. Image information is provided as an array of data, where each location in the array corresponds to a position in the scan pattern. The electrical signals drive a controller 118 that builds up a digital image and transmits it for further processing, decoding, archiving, printing, display, or other treatment or use via interface 120.

Illuminator 104 may include multiple emitters such as, for instance, light emitting diodes (LEDs), lasers, thermal sources, arc sources, fluorescent sources, gas discharge sources, or other types of illuminators. In some embodiments, illuminator 104 comprises a red laser diode having a wavelength of approximately 635 to 670 nanometers (nm). In another embodiment, illuminator 104 comprises three lasers: a red diode laser, a green diode-pumped solid state (DPSS) laser, and a blue DPSS laser at approximately 635 nm, 532 nm, and 473 nm, respectively. Light source 104 may include, in the case of multiple emitters, beam combining optics to combine some or all of the emitters into a single beam. Light source 104 may also include beam-shaping optics such as one or more collimating lenses and/or apertures. Additionally, while the wavelengths described in the previous embodiments have been in the optically visible range, other wavelengths may be within the scope of the invention. Light beam 106, while illustrated as a single beam, may comprise a plurality of beams converging on a single scanner 108 or onto separate scanners 108.

One example of these scanners employs a MEMS scanner capable of deflection about two orthogonal scan axes, in which both scan axes are driven at a frequency near their natural mechanical resonant frequencies. In another example, one axis is operated near resonance while the other is operated substantially off resonance. Such a case would include, for example, the nonresonant axis being driven to achieve a triangular, or a sawtooth, velocity profile as is commonly utilized in cathode ray tube (CRT) devices and discussed in more detail later. In such cases, there are additional demands on the driving circuit, as it must apply force throughout the scan excursion to enforce the desired velocity profile, as compared to the resonant scan where a small amount of force applied for a small part of the cycle may suffice to maintain its sinusoidal velocity profile.

In a resonant scanning beam imager (SBI), the scanning reflector or reflectors oscillate such that their angular deflection in time is approximately a sinusoid, at a mechanical resonant frequency determined by the suspension stiffness and the moment of inertia of the MEMS device incorporating the reflector. Herein this mechanical resonant frequency is referred to as the "fundamental frequency." Motion can be sustained with little energy and the devices can be made robust when they are operated at the fundamental frequency. However, sinusoidal angular deflection is less than optimal for certain applications. The varying velocity inherent in a sinusoidal scan gives varying exposure at a given point in the FOV, thus sensitivity varies with position. Achieving a desired dynamic range and resolution is most problematic in the center of the scan domain because the beam angular velocity is greatest there, requiring higher signal processing bandwidth in order to sustain a required spatial resolution at the target or scene. Therapy based on energy delivery may be least effective there and require compensating modulation. Finally, if the illumination is by laser, the power allowed when the beam reverses position at each extreme of its position is much less than that allowed when it is racing through the center.

By comparison, for some applications a "sawtooth" waveform might be employed, where the beam is translated at uniform velocity over the scene, with a much faster "retrace" at the end of each scan. Alternatively, a "triangle" waveform beam displacement might be employed, where the retrace occurs at the same rate as the scan in the opposite direction. FIG. 4A illustrates how beam position and angular velocity vary a sawtooth approach, and FIG. 4B illustrates the position and velocity vary in a triangular approach. In either approach, the beam velocity is uniform as it moves across the field of view, reducing the bandwidth required in the controller 118, providing more uniform performance over the field of view, and allowing a higher illuminating power level.

SUMMARY

In accordance with this disclosure, scanning beam imagers are provided that include a combination of resonant scanning reflectors that operate at different but coordinated frequencies, phases and/or amplitudes to approximate (within the mathematical limits of a Fourier series) a user designed waveform over the field of view.

Those skilled in the art will appreciate that when an SBI includes multiple reflectors, using Fourier techniques, a wide array of diverse waveforms can be produced. As a result, the SBI becomes a much more flexible tool as waveforms can be tailored to the requisites of a particular application. In one embodiment, a waveform is provided that provides essentially constant velocity with time, similar to a sawtooth waveform, in another embodiment a waveform is adopted that is essentially constant over predetermined velocity similar to a triangular scan. The term "velocity" as used herein can be either the angular velocity of the reflector or the scanning velocity of the beam across any point in the FOV. In still another embodiment, a waveform may be designed that is uniquely adapted to compensate for undesirable or intrinsically interfering aspects of the optical elements in a scan path. In still another embodiment, a waveform can be programmed into the SBI using fourier analysis that accommodates the shape of a target area, e.g., the surface of a tissue or organ.

BRIEF DESCRIPTION OF THE DRAWINGS

FIG. 4 is a series of graphs illustrating the angular beam velocities associated with sawtooth (A) and triangular (B) scans.

DETAILED DESCRIPTION

Before explaining the several embodiments of the present invention in detail, it should be noted that each embodiment is not limited in its application or use to the details of construction and arrangement of parts and steps illustrated in the accompanying drawings and description. The illustrative embodiments of the invention may be implemented or incorporated in other embodiments, variations and modifications, and may be practiced or carried out in various ways. Furthermore, unless otherwise indicated, the terms and expressions employed herein have been chosen for the purpose of describing the illustrative embodiments of the present invention for the convenience of the reader and are not for the purpose of limiting the invention.

It is further understood that any one or more of the following-described embodiments, examples, etc. can be combined with any one or more of the other following-described embodiments, examples, etc.

Figure 1:
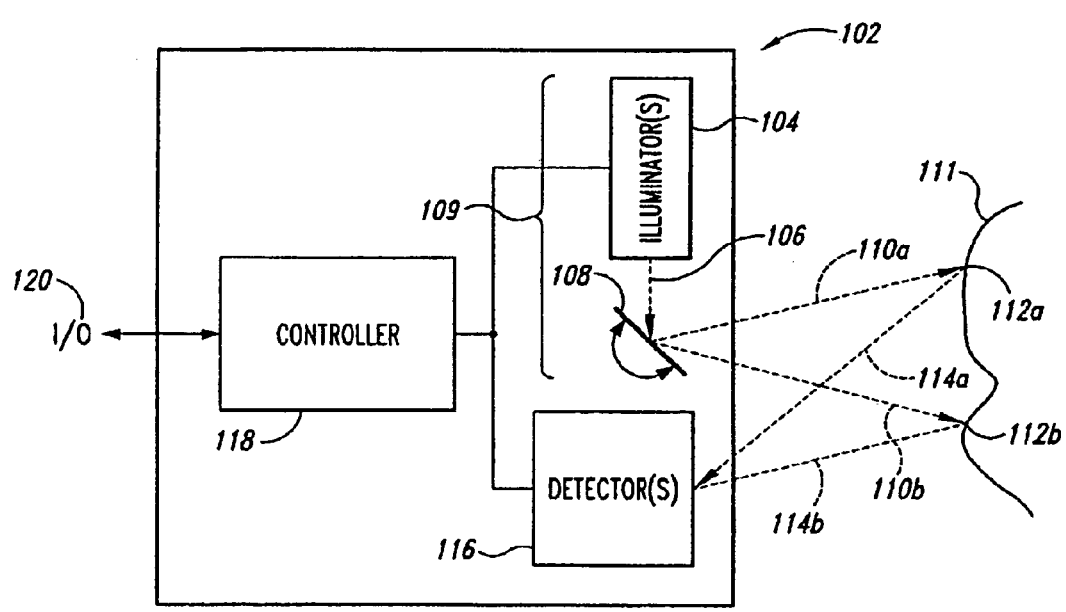
FIG. 1 is a schematic illustration of a scanning beam imager known in the art from Published Application 2005/0020926A1.
Figure 2:
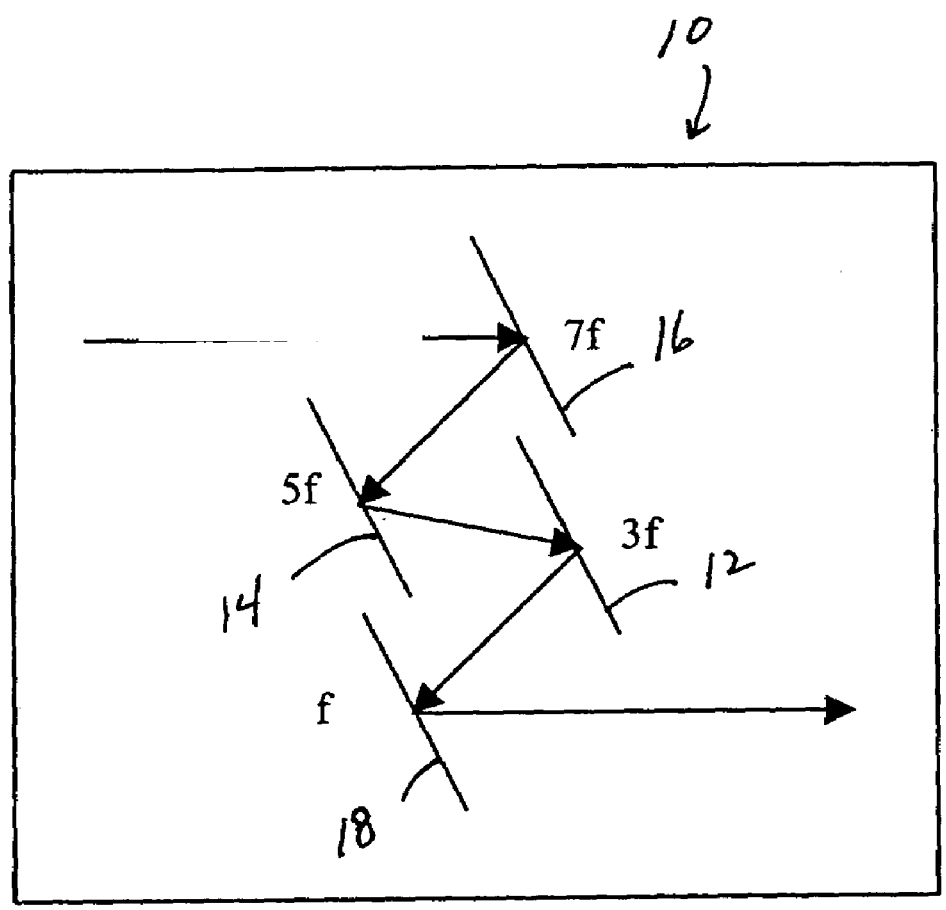
FIG. 2 is a schematic diagram of a combination of reflectors useful in one embodiment of the invention.

FIG. 2 illustrates one embodiment of the invention 10 which employs a "cascade" of reflectors 12, 14, 16, 18, and, more particularly, MEMS scanners. In this figure, the reflectors are shown as projecting out of the plane, and rotating in the plane (about perpendiculars erected to the plane and containing the reflector). This figure shows a single axis of deflection: it may be possible to incorporate both axes of deflection (for example, rotation in the plane and also about the line representing the reflector). Each reflector oscillates/scans at a different rate. In a particular embodiment, each reflector is configured, by appropriate choice of mass, geometry, and suspension stiffness, to have a natural resonance near the frequency ("fundamental frequency") at which it will be driven. Each reflector is then driven to deflect the beam in a sinusoidal pattern having a magnitude, frequency and phase selected to achieve the desired deflection and hence the desired ultimate velocity waveform. In the embodiment shown in FIG. 2, four reflectors are used but those skilled in the art will recognize that the objective, namely, achieving a desired scan velocity waveform, can be achieved using as few as two or as many reflectors as may be desired. Those skilled in the art will recognize that in theory, assuming no attenuation of the scanning beam upon reflection, there is no limit on the number of reflectors; and under Fourier theory, the more reflectors that are available, the more accurately or closely one can approximate the user designed waveform. In practice where the size of the imager is limited, the number of reflectors will generally be 2 to about 6, and typically 2 to 4.

It is assumed for the purposes of this discussion, and in accordance with one embodiment, the reflectors are driven near their fundamental frequencies, as described above, because of the high efficiency possible: large excursions can thereby be achieved with less drive power. Of course if one desires to drive the reflectors at a different and likely less efficient frequency, it will not avoid this invention.

In order to achieve the desired scan, the reflectors are driven by a drive circuit. Near resonance, the relationships between the amplitude and phase of the driving waveform (e.g., the waveform that drives a MEMS reflector device) and the amplitude and phase of the resulting motion may vary strongly, and nonlinearly, with frequency. Among the factors that can affect the relationship between the driving waveform and the angular velocity waveform of the MEMS are temperature, external vibration, strain, atmosphere and other factors.

Figure 5A:
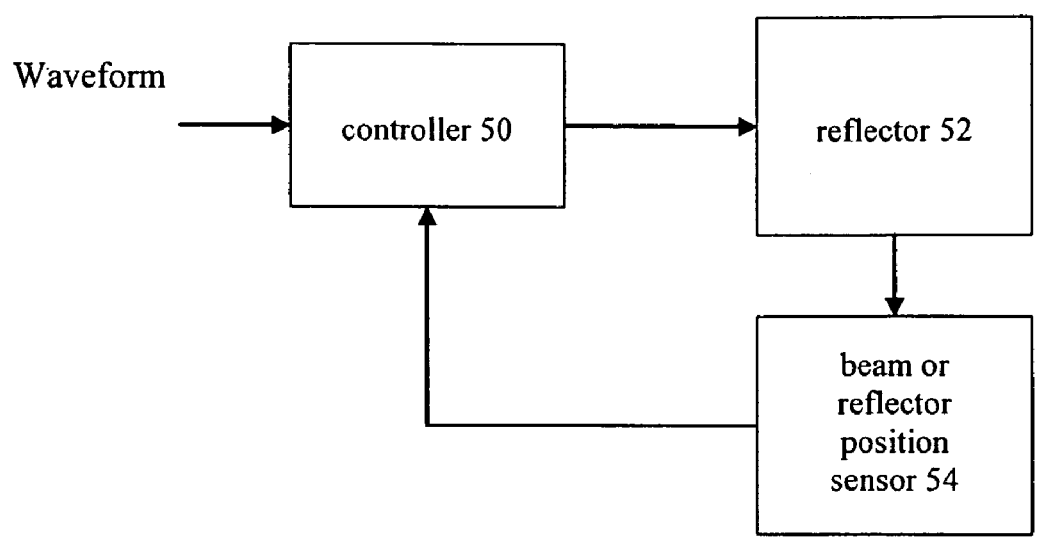
FIGS. 5 & 6 are flow charts showing processes for controlling drive circuits for SBI reflectors with feedback (FIG. 5) and without (FIG. 6).
Figure 5B:
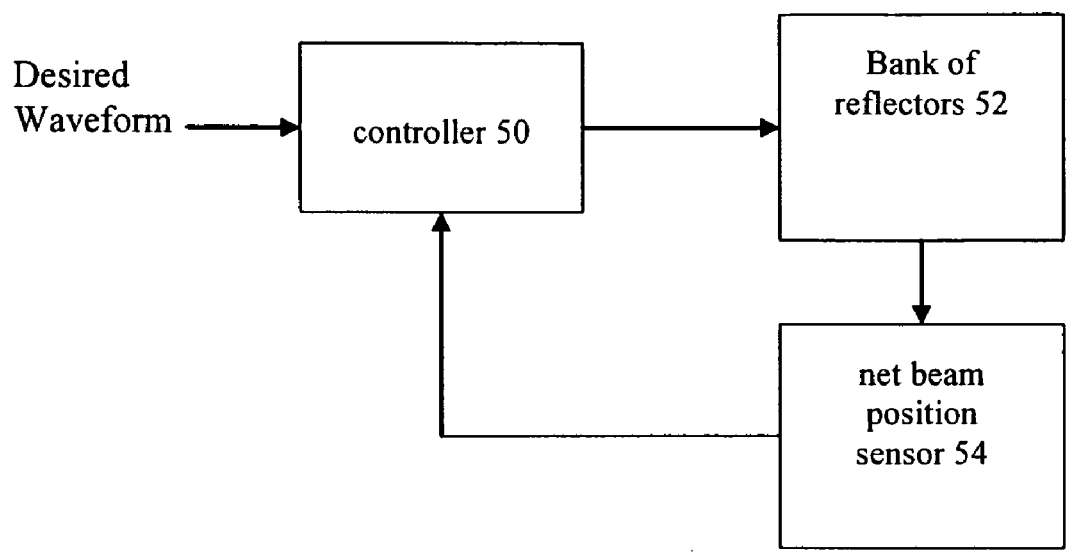

Accordingly, in one embodiment as illustrated in FIG. 5A feedback is employed to enable the driving circuit 50 to force the reflector 52 movement to the desired phase and amplitude. This feedback may be implemented by measurement of reflector position (for example by capacitive displacement sensor, strain gauges on the suspensory elements, etc.) or actual measurement of beam position (for example using an auxiliary pixilated sensor or a silicon strip sensor 54 similar to that as described in *Nuclear Science Symposium Conference Record*, 2005 *IEEE* 23-29 Oct. 2005 Volume: 2, page(s) 781-785). FIG. 5B illustrates a control circuit in accordance with another embodiment of the invention in which the controller compares the net beam position as detected at 54 and uses Fourier analysis to make appropriate adjustments in one or more of the oscillating reflectors 54.

Figure 6:
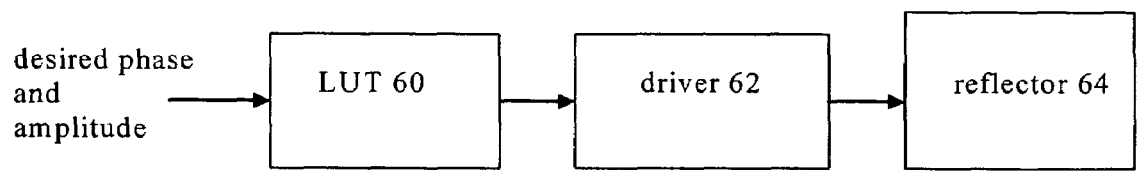

In applications where the relationship between the driving waveform and the reflector waveform is fairly stable (that is, where factors such as the temperature, external vibration, strain, atmosphere do not vary significantly), as illustrated in FIG. 6 it may be possible to characterize the phase and amplitude relationship and operate the system "open loop," without feedback. In this embodiment, a simple lookup table (LUT) 60 outputs the actual drive amplitude and phase 62 required for the reflector 64 when given the desired amplitude and phase.

Those skilled in the art will appreciate that reflector control can be approached from different perspectives. In one embodiment of the invention involves closed loop control wherein one may program the controller with a target waveform and measure the net beam deflection, perform a Fourier analysis of it, and then adjust the phases and amplitudes of the drive signals for the reflectors in the directions that minimize the phase and amplitude error from what it mathematically should be for the target waveform. In another embodiment one drives the individual reflectors according to the fourier analysis of the target waveform.

Figure 7:
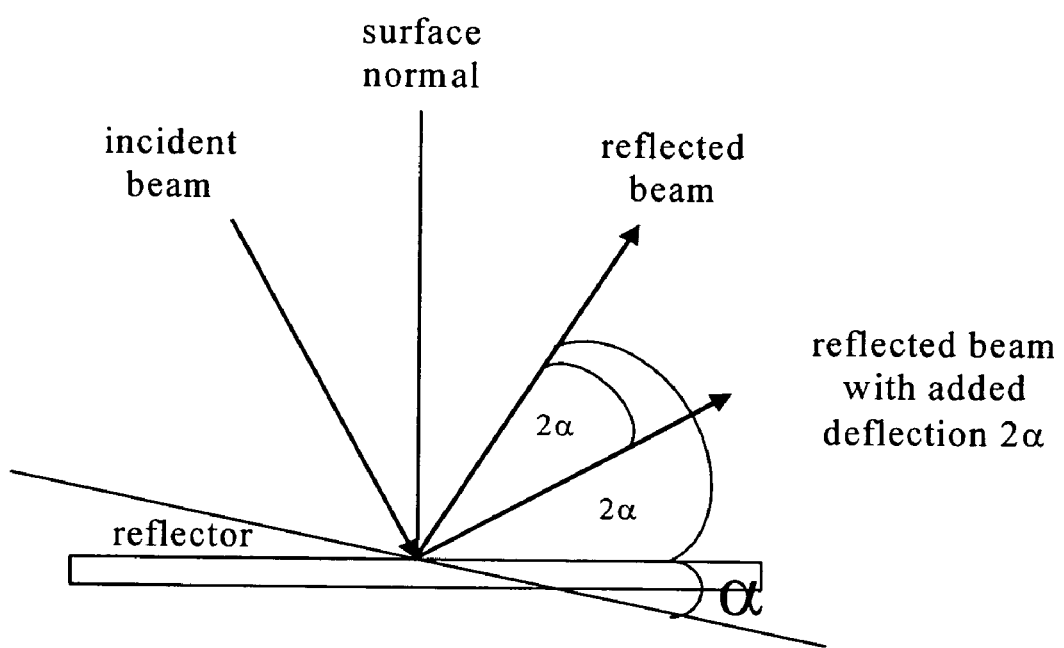
FIG. 7 is a schematic diagram of the effect of rotation of the reflector by an angle α on the displacement of the incident beam.

Each reflector contributes an additive angular displacement to the beam, as illustrated in FIG. 7. Here, the incident beam 70 is reflected an additional amount as 2α a result of the rotation of the reflector 72 by then angle α in a global coordinate system.

It will be clear, then, that each succesive reflection adds a deflection (alpha) proportional to that reflector's angular excursion. Since each reflector's excursion is sinusoidal, the total deflection is a sum of sinusoidal quantities. Any periodic waveform can be approximated by a sum of appropriatelyweighted sinusoids whose frequencies are harmonics of the original waveform. The method of Fourier analysis is used to arrive at the weightings, and the set of weights defines a Fourier series. Furthermore, since both sine and cosine terms are the typical result of such analyses, the requisite phase for each sinusoid is also obtained.

For example, Fourier analysis indicates that a triangle wave with argument x may be approximated by the series $$\sin(x) - \frac{\sin(3x)}{3^2} + \frac{\sin(5x)}{5^2} - \cdots$$

and a sawtooth wave (with zero retrace time) by the series $$\sin(x) - \frac{\sin(2x)}{2} + \frac{\sin(3x)}{3} - \frac{\sin(4x)}{4} + \frac{\sin(5x)}{5} - \cdots$$

The error in the approximation depends on the number of terms and, except where the waveform changes abruptly, can be reduced to any required degree. Therefore, even when the individual reflectors are moving in sinusoidal fashion, it is possible to approximate any desired velocity profile, and in particular a uniform velocity profile across the field of view.

Figure 3:
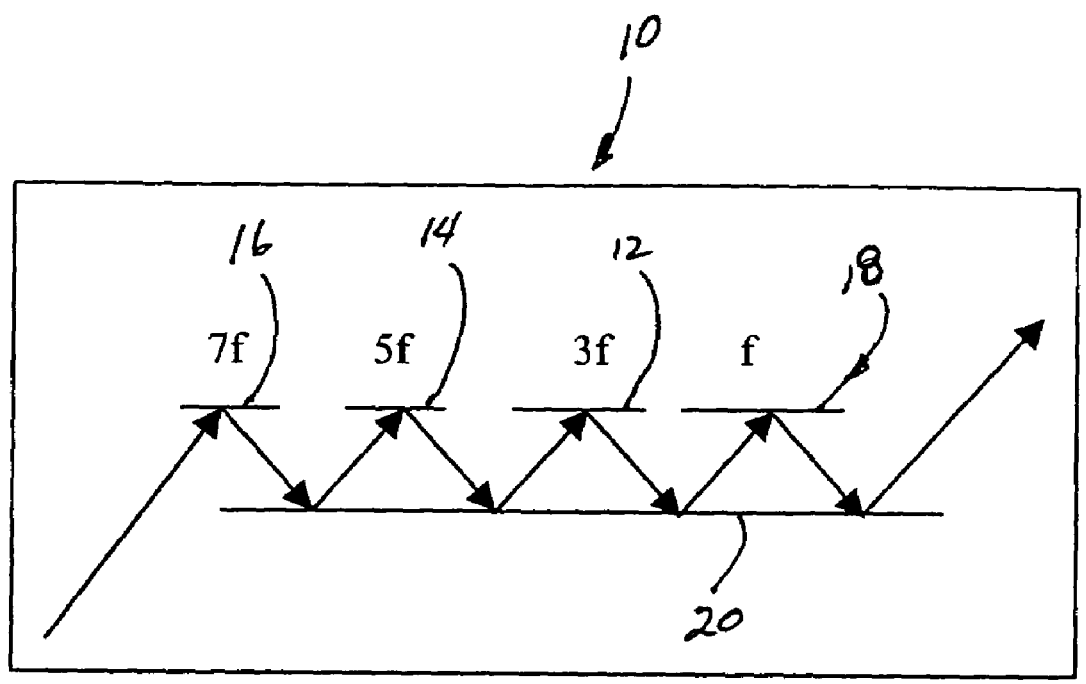
FIG. 3 is a schematic diagram of a combination of reflectors useful in another embodiment of the invention.

FIG. 3 illustrates a further embodiment of the invention in which the reflectors 12, 14, 16 and 18 are aligned in a common plane and the light is reflected from a fixed reflector 20. The same considerations govern the design and operation of this scanner as govern the design and operation of the scanner in FIG. 2.

MEMS scanners can be designed fabricated using any of the techniques known in the art as summarized in the following patent references. Some embodiments use a MEMS scanner. A MEMS scanner may be of a type described in, for example; U.S. Pat. No. 6,140,979, U.S. Pat. No. 6,245,590, U.S. Pat. No. 6,285,489, U.S. Pat. No. 6,331,909, U.S. Pat. No. 6,362,912, U.S. Pat. No. 6,384,406, U.S. Pat. No. 6,433,907, U.S. Pat. No. 6,512,622, U.S. Pat. No. 6,515,278, U.S. Pat. No. 6,515,781, and/or U.S. Pat. No. 6,525,310, all hereby incorporated by reference. In one embodiment, the reflectors are magnetically resonant scanners as described in U.S. Pat. No. 6,151,167 of Melville or a micromachined scanner as described in U.S. Pat. No. 6,245,590 to Wine et al.

While the present invention has been illustrated by descriptions of a method, several expressions of embodiments, and examples, etc. thereof, it is not the intention of the applicants to restrict or limit the spirit and scope of the appended claims to such detail. Numerous other variations, changes, and substitutions will occur to those skilled in the art without departing from the scope of the invention. It will be understood that the foregoing description is provided by way of example, and that other modifications may occur to those skilled in the art without departing from the scope and spirit of the appended Claims.

What is claimed is:

1. In a scanning beam assembly comprising:
   a beam generator to generate a beam of radiation, and
   two or more oscillating reflectors configured to deflect the beam in sequence, each reflector being driven to contribute an incremental deflection of the beam so as to achieve a desired scanning beam waveform, at least one oscillating reflector aligned to receive the beam from the beam generator and deflect the beam to a second oscillating reflector, each oscillating reflector operating in a sinusoidal mode having a frequency and amplitude, and
   a controller for controlling the phase and/or frequency and/or amplitude of the oscillation of the reflectors so as to provide a desired scanning beam waveform.

2. The scanning beam assembly of claim 1 wherein the resultant waveform is approximately linear for a portion of its period.

3. The scanning beam assembly of claim 1 wherein the at least two of the reflectors oscillate about substantially parallel axes.

4. The scanning beam assembly of claim 1 wherein one of the oscillating reflectors has a fundamental frequency of resonance and the other reflectors operate at odd harmonics of the fundamental resonance frequency.

5. The scanning beam assembly of claim 1 wherein the amplitude of a successive reflector's deflection is the inverse square of the harmonic number.

6. The scanning beam assembly of claim 1 wherein the oscillating reflectors rotate about axes that are parallel and in a common plane and each oscillating reflector directs light to a fixed reflector which redirects the light sequentially to the next sinusoidally oscillating reflector.

7. The scanning beam assembly of claim 1 wherein the beam generator illuminates an optical fiber which transmits the beam to at least one of the reflectors.

8. The scanning beam assembly of claim 1 wherein the scanning beam assembly additionally includes at least one detector positioned to receive light reflected from the field of view.

9. The scanning beam assembly of claim 1 wherein the reflector includes a MEMS scanner.

10. The scanning beam assembly of claim 1 wherein the assembly includes a detector capable of generating a signal indicative of the position, frequency or amplitude of at least one reflector and the signal provides an output that is fed back to the controller to control the oscillation of at least one of the reflectors.

11. The scanning beam assembly of claim 1 wherein the controller is programmable with the desired waveform.

12. The scanning beam assembly of claim 11 wherein the controller performs a Fourier analysis based upon the desired waveform to control the oscillation of at least two oscillating reflectors.

13. The scanning beam assembly of claim 11 wherein the assembly includes a detector capable of generating a signal indicative of the position, frequency or amplitude of at least one reflector and the signal provides an output that is fed back to the controller to control the oscillation of at least one of the reflectors.

14. A scanned beam endoscope comprising:
   an endoscope, and a scanning beam assembly including:
      a beam generator to generate a beam of radiation, and
      two or more oscillating reflectors configured to deflect the beam in sequence, each reflector being driven to contribute an incremental deflection of the beam so as to achieve a scanning beam waveform, at least one oscillating reflector aligned to receive the beam from the beam generator and deflect the beam to a second oscillating reflector, each oscillating reflector operating in a sinusoidal mode having a frequency and amplitude, and
   a controller for controlling the frequency and/or amplitude an/or phase of the oscillation of the reflectors so as to provide a desired scanning beam waveform.

15. A scanning endoscope tip comprising:
   a beam generator to generate a beam of radiation, and two or more oscillating reflectors configured to deflect the beam in sequence, each reflector being driven to contribute an incremental deflection of the beam so as to achieve a scanning beam waveform, at least one oscillating reflector aligned to receive the beam from the beam generator and deflect the beam to a second oscillating reflector, each oscillating reflector operating in a sinusoidal mode having a frequency and amplitude, and a controller for controlling the frequency and/or amplitude and/or phase of the oscillation of the reflectors so as to provide a desired scanning beam waveform.

16. The scanning endoscope tip of claim 15 wherein the at least two of the reflectors oscillate about substantially parallel axes.

17. The scanning endoscope tip of claim 15 wherein one of the oscillating reflectors has a fundamental frequency of resonance and the other reflectors operate at odd harmonics of the fundamental resonance frequency.

18. The scanning endoscope tip of claim 15 wherein the amplitude of a successive reflector's deflection is the inverse square of the harmonic number.

19. The scanning endoscope tip of claim 15 wherein the oscillating reflectors rotate about axes that are parallel and in a common plane and each oscillating reflector directs light to a fixed reflector which redirects the light sequentially to the next sinusoidally oscillating reflector.

20. The scanning endoscope tip of claim 15 wherein the beam generator illuminates an optical fiber which transmits the beam to at least one of the reflectors.

\* \* \* \* \*